United States Patent
Bollin et al.

(10) Patent No.: US 9,148,998 B2
(45) Date of Patent: Oct. 6, 2015

(54) HEADER HEIGHT CONTROL SYSTEM

(75) Inventors: Douglas J Bollin, Kaisersltern (DE); Sean Bollin, Moline, IL (US); Daniel L Wiltse, Davenport, IA (US)

(73) Assignee: DEERE & COMPANY, Moline, IL (US)

(*) Notice: Subject to any disclaimer, the term of this patent is extended or adjusted under 35 U.S.C. 154(b) by 483 days.

(21) Appl. No.: 13/572,630

(22) Filed: Aug. 11, 2012

(65) Prior Publication Data
US 2014/0041351 A1    Feb. 13, 2014

(51) Int. Cl.
*A01D 41/14*    (2006.01)
*A01D 41/127*   (2006.01)

(52) U.S. Cl.
CPC ............ *A01D 41/127* (2013.01); *A01D 41/141* (2013.01)

(58) Field of Classification Search
USPC ........... 701/50; 56/10.2 D, 10.2 E, 14.9–15.2, 56/15.7–15.9, 17.1, 208–214, DIG. 10, 14, 56/15
See application file for complete search history.

(56) References Cited

U.S. PATENT DOCUMENTS

| 3,704,574 | A | | 12/1972 | Gardner | |
|---|---|---|---|---|---|
| 5,359,836 | A | * | 11/1994 | Zeuner et al. | 56/10.2 E |
| 5,471,823 | A | * | 12/1995 | Panoushek et al. | 56/10.2 E |
| 7,707,811 | B1 | | 5/2010 | Strosser | |
| 8,401,745 | B2 | * | 3/2013 | Otto et al. | 701/50 |
| 2003/0000193 | A1 | * | 1/2003 | Beck et al. | 56/10.2 E |
| 2011/0154795 | A1 | | 6/2011 | Sauerwein et al. | |

FOREIGN PATENT DOCUMENTS

| DE | 4406892 A1 | 9/1995 |
|---|---|---|
| RU | 2282971 C2 | 9/2006 |
| SU | 535026 A1 | 1/1977 |
| SU | 1060134 A | 12/1983 |
| SU | 1547760 A1 | 3/1990 |

OTHER PUBLICATIONS

European Search Report, dated Nov. 28, 2013 (9 Pages).
Eurasian Search Report (3 pages), Dec. 23, 2013.

* cited by examiner

*Primary Examiner* — Alicia Torres

(57) ABSTRACT

A header height control system having an operator input device for selecting a desired height of travel of an agricultural harvesting head above the ground, and wherein the system controls the agricultural harvesting head height based at least upon a header height control algorithm that is selected based at least upon the desired height of travel.

12 Claims, 3 Drawing Sheets

HEADER HEIGHT CONTROL SYSTEM

FIELD OF THE INVENTION

This invention relates to circuits for controlling the height of agricultural harvesting heads above the ground as they travel through the field harvesting crops.

BACKGROUND OF THE INVENTION

Agricultural harvesters are comprised of a self propelled agricultural harvesting vehicle often called a "combine" that supports an agricultural harvesting head also known as a "header". The header separates the crop from the ground and carries it rearward through an opening in the header. The crop is then sent to the agricultural harvesting vehicle where it is threshed, separated, and cleaned.

For many crops, it is important for the header to travel very close to the ground so it collects all the crop that is being harvested. This is particularly important for crops such as soybeans, which are small bush-like plants only a foot or two high. For crops like these, the header is often positioned to drag along the ground itself, or bounce slightly over the surface of the ground to ensure that it captures all of the crop. One of the dangers of operating a header this close to the ground is the risk that will run into the ground or an obstruction of on the ground and be damaged.

Other crops, like wheat or corn, are much taller. The crop portions of these plants are carried much higher in the air. To harvest these crops, the header can be operated relatively high in the air away from any obstructions. The risk of colliding with the ground is limited, and the agricultural harvester can therefore be operated at a higher speed of travel through the field.

Different control systems are used to control the height of the header above the ground.

In one system such as US2011/0154795, a height sensor is disclosed that generates a signal indicating the distance between the bottom of the header and the ground and provides a feedback signal to control the height of header 104. If the height sensor shows that the header is too close to the ground, a control circuit energizes actuators that lift the header until the appropriate height is reached.

In another system, the fluid pressure in the hydraulic or pneumatic members that support the header and raise it up and down is monitored. When this pressure decreases, it indicates that the header is running into the ground. A control circuit then raises the header until the pressure returns to its nominal value indicating that the header is being supported above the ground.

Neither of these control systems is sufficient to control the header height over a wide range of header heights.

What is needed is a control system that will provide more accurate control of header height over a wider range of height settings.

The invention described in claim 1 of this application provides that benefit. The other arrangements described in the dependent claims provide additional advantages that are discussed below.

SUMMARY OF THE INVENTION

In accordance with a first aspect of the invention, a header height control system is provided comprising: an agricultural harvester including a self-propelled harvesting vehicle and an agricultural harvesting header supported on the self-propelled agricultural vehicle; an ECU; at least one height sensor coupled to the ECU to provide a signal to the ECU indicative of a height of the header above the ground; at least one load sensor coupled to the ECU to provide a signal to the ECU indicative of a load applied by the header; and an operator input device coupled to the ECU configured to generate a signal indicating a desired height of travel of the header above the ground when manipulated by the operator; and at least one header support disposed to change the height of the agricultural harvesting header with respect to the self-propelled harvesting vehicle, said at least one header support being coupled to the ECU such that the ECU can drive the at least one header support to raise and lower the agricultural harvesting head with respect to the self-propelled harvesting vehicle wherein the ECU is configured to (a) read the operator input device and input the signal indicative of the desired height of travel therefrom, (b) select between a first header height control algorithm and a second header height control algorithm based upon the value of the signal indicative of the desired height of travel, and (c) drive the at least one header support to the desired height of travel using the selected first or second header height control algorithm.

The first header height control algorithm may be associated with a first plurality of operator selectable heights of travel, and wherein the second header height control algorithm may be associated with a second plurality of operator selectable desired heights of travel.

The first plurality of operator selectable desired heights of travel may be higher than the second plurality of operator selectable desired heights of travel.

The first header height control algorithm may be at least responsive to a height error signal.

The ECU may derive the height error signal by calculating a difference between the signal indicative of the desired height of travel and a header height indicated by the at least one height sensor.

The first header height control algorithm may be also responsive to a load error signal, and further wherein the ECU may calculate the load error signal based upon a difference between the signal indicative of a load applied by the header and a reference load signal derived by the ECU from a time sequence of signals from the at least one load sensor.

The second header height control algorithm may be at least responsive to a load error signal.

The ECU may derive the load error signal by calculating a difference between a reference load value and a header load indicated by the at least one load sensor.

The ECU may calculate the reference load value by averaging a time sequence of load signals taken from the at least one load sensor.

The ECU may calculate the reference load value by selecting the reference load value from between a predetermined load value and a second predetermined load value, wherein the second predetermined load value may be indicative of a signal received from the at least one load sensor when it is operating at substantially its lowest operating height when traveling through the field harvesting crop.

The ECU may be configured to (a) read the operator input device and input the signal indicative of the desired height of travel therefrom, (b) select between a first header height control algorithm, second header height control algorithm, and third header height control algorithm based upon the value of the signal indicative of the desire height of travel, and (c) drive the at least one header support to the desired height of travel using the selected one of the first height control algorithm, the second header height control algorithm, or the third header height control algorithm.

The first header height control algorithm may be associated with a first plurality of operator selectable desired heights of travel, wherein the second header height control algorithm is associated with a second plurality of operator selectable desired heights of travel, and wherein the third header height control algorithm is associated whit a third plurality of operator selectable desired heights of travel.

The first plurality of operator selectable desired heights of travel may be higher than the second plurality of operator selectable desired heights of travel and further wherein the second plurality of operator selectable desired heights of travel are higher than the third plurality of operator selectable desired heights of travel.

The first header height control algorithm may be predominantly responsive to a height error signal, wherein the second header height control algorithm is predominantly responsive to a height error signal and a load error signal, and wherein the third header height control algorithm is predominantly responsive to a load error signal.

The height error signal may be derived from a difference between an operator selected desired height of travel of the header and the signal indicative of a height of the header provided by the at least one height sensor.

The load error signal may be derived from a difference between a reference load value and the signal indicative of a load applied by the header.

The first header height control algorithm may not be derived from a header load error, and wherein the third header height control algorithm may not be derived from a header height error.

DETAILED DESCRIPTION

Figure 1:
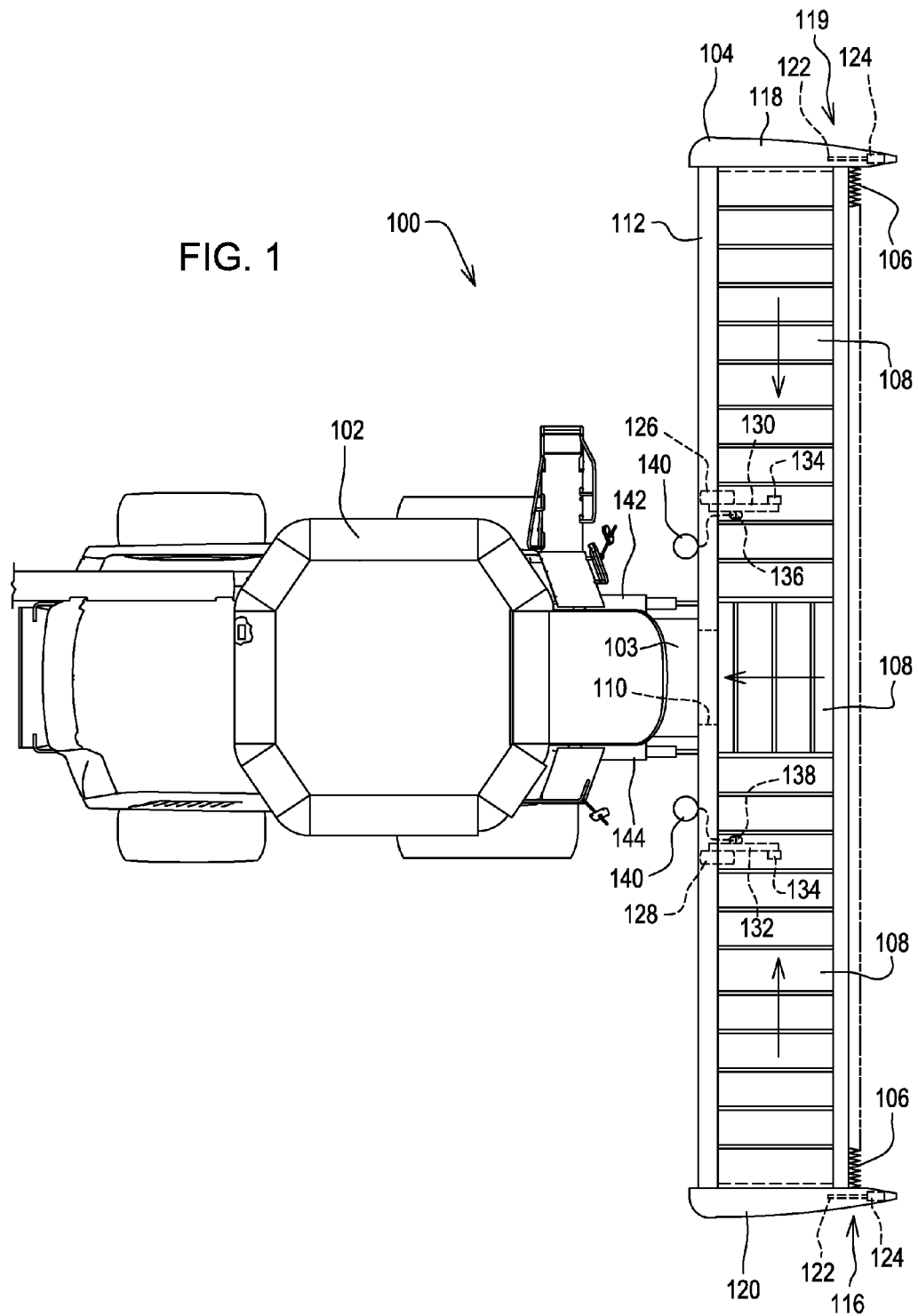
FIG. 1 is a plan view of an agricultural harvester in accordance with the present invention.
Figure 2:
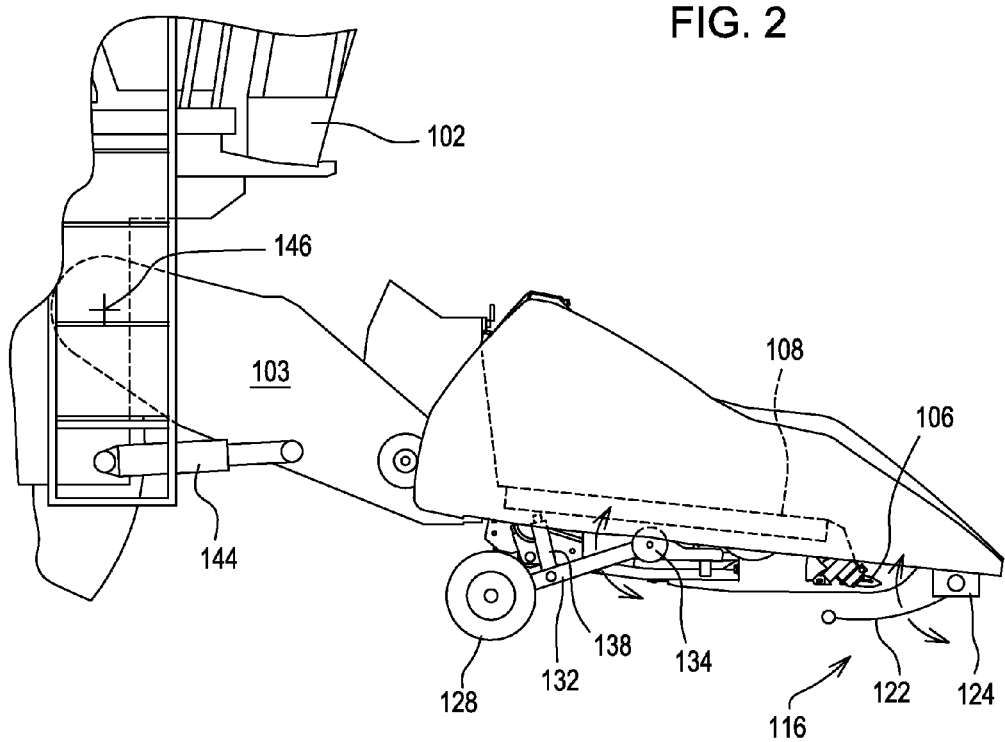
FIG. 2 is a side view of the agricultural harvester of FIG. 1.

In FIGS. 1 and 2, an agricultural harvester 100 is shown that comprises a self-propelled harvesting vehicle 102 to which a feeder house 103 is attached and extends forward therefrom. An agricultural harvesting head (called a "header" herein) 104 is supported on the feeder house. The header 104 has a cutter bar 106 disposed across substantially the entire leading edge of the header 104. This cutter bar 106 severs the crop plants from their roots causing the plants to fall backwards onto conveyor belts 108 that carry the crop rearward through an aperture 110 in the frame 112 of the header 104. The severed crop plants are deposited on a conveyor disposed inside the feeder house 103 which carries them backwards into the self-propelled harvesting vehicle 102. Once inside the vehicle 102, the crop plants are threshed, separated, and cleaned.

Height sensors 114, 116 are disposed at each opposing lateral end of the header 104. These sensors are supported at crop dividers 118, 120 disposed at either end of the header 104. Each of these sensors has a sensor arm 122 that rests upon the ground. As the header 104 travels through the field, and the header 104 rises and falls with respect to the ground, the sensor arms pivot up and down at their rear ends rotating a sensor element 124 that generates a changing signal indicative of the changing height of the header 104 above the ground.

Two gauge wheels 126, 128 are disposed on either side of the header 104 to assist in supporting the header 104 is it travels over the field. These gauge wheels 126, 128 are supported for rotation on pivoting float arms 130, 132. Pivoting float arms 130, 132 are supported on the frame 112 to pivot with respect thereto at forward ends of the float arms 130, 132. Each float arm has a sensor element 134 that senses the pivoting of the float arms with respect to the frame 112 of the header 104. Thus, as the header 104 rises and falls as it travels over the ground, the gauge wheels 126, 128 remain in contact with the ground. The float arms 130, 132 accordingly pivot up and down to maintain this ground contact of the gauge wheels 126, 128. This pivoting causes the sensor elements 134 on each float arm to generate a changing signal. The signal indicates the height of the header 104 above the ground. The sensor elements 134 therefore function as height sensors indicating the height of the header 104.

Support cylinders 136, 138 are coupled between the frame 112 of the header 104 and the pivoting float arms 130, 132 to apply a downward pressure on the pivoting float arms 130, 132 and thereby at least partially support the weight of the header 104 on the gauge wheels 126, 128. Support cylinders 136, 138 are typically hydraulic cylinders coupled to one or more gas-charged accumulator 140. This arrangement collectively functions as a spring support at each of the gauge wheels 126, 128 to at least partially support the weight of the header 104 in some modes of operation. FIG. 2 shows the arrangement of gauge wheel 128, support cylinder 138, float arm 132, and sensor element 134 on the right side of the header 104. The arrangement on the left side of the header 104 is identical but in mirror image form.

Header supports 142, 144 (here embodied as hydraulic cylinders) are disposed between the chassis of self propelled harvesting vehicle 102 and feeder house 103 to support the forward end of feeder house 103. The rear end of feeder house 103 is pivotally coupled to the chassis of self propelled harvesting vehicle 102. As header supports 142, 144 increase and decrease in length (e.g. the hydraulic cylinders extend and retract) the front end of the feeder house pivots up and down about the pivotal axis 146 defined by the pivotal connection of the rear of the feeder house 103 to the chassis of self propelled harvesting vehicle 102. Since the weight of the header 104 is supported on the feeder house, and since the feeder house is supported by the header supports 142, 144, the pressure of the hydraulic fluid in header supports 142, 144 is indicative of the weight of the header 104. If the header 104 is lowered slowly, gradually transferring its weight to the ground (by releasing hydraulic fluid from header supports 142, 144) the pressure in the header supports 142, 144 will gradually drop to zero as the entire weight of the header 104 ultimately rests upon the ground.

Figure 3:
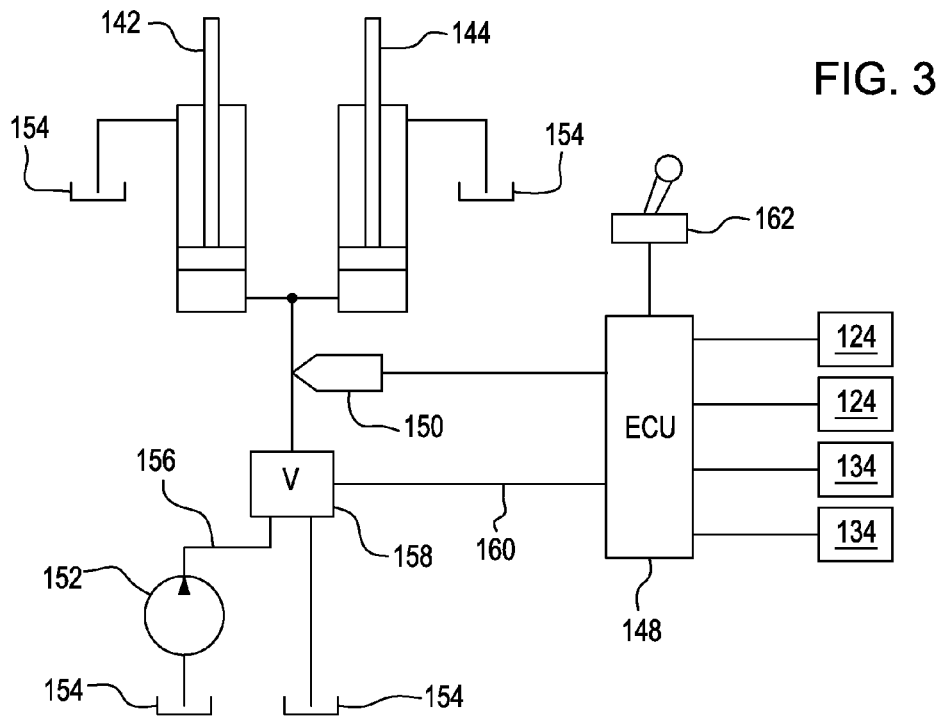
FIG. 3 is a schematic representation of a header height control circuit with the agricultural harvester of FIGS. 1-2.

In FIG. 3, an electronic control unit (ECU) 148 is coupled to sensor elements 124, and sensor elements 134. Sensor elements 124 indicate the height of the header 104 at opposite ends of the header 104. Sensor elements 134 indicate the height of the header 104 at the gauge wheels 126, 128. A load sensor 150 (here shown as a hydraulic fluid pressure sensor) is coupled to the hydraulic circuit that extends and retracts header supports 142, 144. Load sensor 150 generates a signal indicative of the pressure in header supports 142, 144. The signal therefore also indicates the portion of the weight of header 104 that is supported upon the feeder house. Alternatively, the load sensor can be a strain gauge coupled to a load-bearing element of the combine, feeder house or header 104 that similarly indicates the load of the header 104 upon the feeder house.

For a typical header traveling close to the ground (i.e. at a very low header height setting, for example, 5 cm or less), a sudden, sharp decrease in the load (indicated by a load sensor such as load sensor 150) is almost always due to a header collision with the ground. When this occurs, the header should be immediately lifted to prevent damage to the header.

For a typical header traveling through the field with a header height significantly above the ground (i.e. when there are 10-20 centimeters of space between the reciprocating knife 106 and the surface of the ground), a fluctuation in the load is highly unlikely to be due to a header collision with the ground. This is particularly true if the sensor elements 124, 134 indicate that the header is significantly above the ground. In a case like this, immediate, forceful action need not be taken to lift the header up in the air and away from the ground.

ECU 148 is configured to control the height of the header 104 above the ground by varying the amount of hydraulic fluid in header supports 142, 144. To lift the header 104, hydraulic fluid is inserted into the cylinder side of header supports 142, 144. Two lower the header 104, hydraulic fluid is removed from the cylinder side of header supports 142, 144.

A hydraulic pump 152 is disposed on self propelled harvesting vehicle 102 and is driven by the engine of that vehicle. Hydraulic pump 152 receives hydraulic fluid from a hydraulic fluid reservoir 154. It applies hydraulic fluid under pressure to a conduit 156.

Valve 158 is controlled by ECU 148 to either conduct hydraulic fluid under pressure from hydraulic pump 152 into the cylinder side of header supports 142, 144, to keep valve 158 closed and maintain the hydraulic fluid in header supports 142, 144, or to release hydraulic fluid under pressure from the cylinder side of header supports 142, 144 back to hydraulic fluid reservoir 154. In the first of these modes, it extends the header supports 142, 144, pivoting the feeder house 103 upward, and lifting the header 104 supported on the feeder house. In the third of these modes, it retracts the header supports 142, 144, pivoting the feeder house 103 downward, thereby lowering the header 104 closer to the ground.

ECU 148 applies a control signal to valve 158 over signal line 160. A valve driver circuit or other signal conditioning circuit may be provided between the ECU 148 and the valve 158 to amplify and/or condition the signal to the valve 158.

ECU 148 comprises a digital microprocessor, electronic memory circuits (e.g. ROM) storing instructions for the digital controller or microprocessor, and a working memory (e.g. RAM) for temporarily storing values of sensor signals and various computations performed by the digital microprocessor. The ECU 148 illustrated herein can be a single digital microprocessor with associated memory, or it can be a plurality of digital microprocessors (with memory) coupled together over communications medium such as a controller area network, local area network, wide area network, or an internet cloud. In the case that ECU 148 comprises a plurality of digital microprocessors, the functions described herein as being performed by ECU 148 can be divided up between each of the plurality of digital electronic controllers such that each of the plurality of digital electronic controllers performs a subset of the functions described herein.

An operator input device 162 is provided in the operator's cab of the self propelled harvesting vehicle 102. Operator input device 162 is coupled to ECU 148 to permit the operator to enter a desired height of the header 104 above the ground at which the ECU 148 should maintain the header 104. The operator input device can be any of a variety of input devices, such as knobs, key pads, touch screens, levers, or joysticks. Whatever the particular arrangement of the operator input device 162, its function is to generate a signal in response to operator input that the operator input device 162 then transmits to ECU 148.

Figure 4:
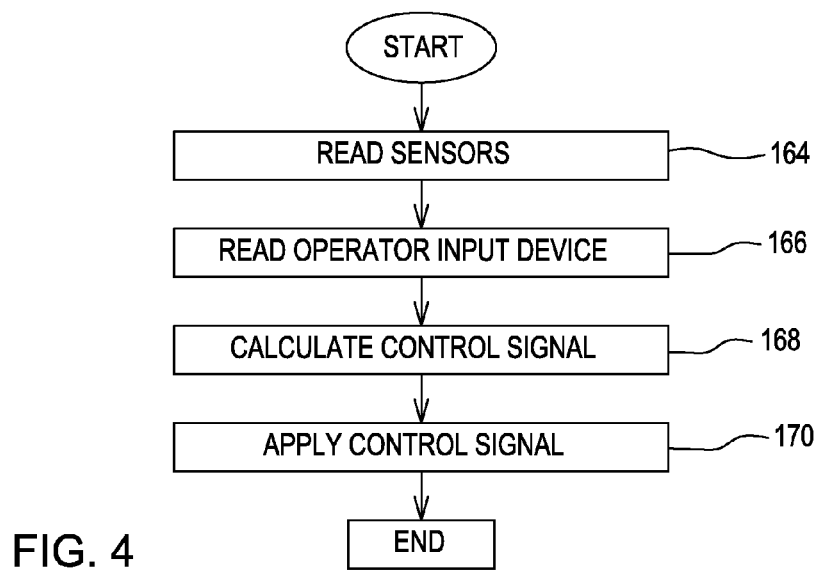
FIG. 4 is a flow chart of the operation of the header height control circuit of FIG. 3.

FIG. 4 shows the programmed steps executed by the ECU 148 as it controls the header height. ECU 148 is programmed to repeatedly execute these programmed steps every 5-100 milliseconds while traveling through the field harvesting crops.

At the beginning of the control loop, the ECU 148 reads the sensor elements in step 164, including sensor elements 124, sensor elements 134, and load sensor 150. These values are stored for later use in the header height control algorithm in step 168.

In step 166, ECU 148 reads the operator input device to determine the operator's desired height of the header 104 above the ground. This value is stored for later use in the header height control algorithm in step 168.

In step 168, the ECU 148 calculates the control signal it will apply to the valve 158 in order to drive the header 104 to the desired height.

In step 170, after calculating the control signal in step 168, the ECU 148 applies the control signal it has just calculated to valve 158 to either raise or lower the header 104 closer to the desired height.

The steps in FIG. 4 are performed continuously and repetitively while the agricultural harvester 100 is in operation, traveling through the field harvesting crops.

To calculate the control signal in step 168, the ECU 148 first determines which algorithm it will use to control the height of the header 104. The algorithm is selected at least in part based upon the desired height of the header 104 above the ground (which the operator selects using the operator input device 162 in step 166).

ECU 148 compares the desired height with at least one predetermined height value stored in the memory circuits of ECU 148. If the desired height is above the predetermined height value, then ECU 148 executes a first header height control algorithm to control the height of the header 104. If the desired height is below the predetermined height value, then ECU 148 executes a second header height control algorithm to control the height of the header 104.

In one embodiment, the ECU 148 compares the desired height with two height values, a higher height value and a lower (i.e. smaller) height value. If the desired height is above the higher height value the ECU 148 selects a first control algorithm. If the desired height is below the higher height value and above the lower height value, the ECU 148 selects a second control algorithm. If the desired height value is below the lower height value, the ECU 148 selects a third control algorithm.

The two desired height values therefore divide the total range of operating heights into three desired height zones: a high zone in which ECU 148 controls header height using a first algorithm, a low zone in which ECU 148 controls header height using a third algorithm, and an intermediate zone between the high and the low zones, in which ECU 148 controls the header height using a second algorithm.

The first algorithm depends primarily on the header height signals provided by sensor elements 124 or 134. The second algorithm depends primarily on the header height signals provided by sensor elements 124, 134, but also on the load signal provided by the load sensor 150 to prevent collisions with the ground. The third algorithm depends primarily on the load signal provided by the load sensor 150.

The First Algorithm

In the first algorithm, the ECU 148 calculates the difference between the height signals from one or more of the sensor elements 124, 134 and the desired height value to determine a height error signal. ECU 148 then processes the height error signal using a first control function (for example a P, PD, PID, or PI function) to generate a valve control signal that ECU 148 then applies (in step 170) to valve 158. This valve control signal is based solely on the height of the header 104 above the ground.

The Second Algorithm

In the second algorithm, the header height is controlled based primarily upon both the header height and the load signal.

ECU 148 calculates a first partial valve control signal based on header height. ECU 148 then calculates a second partial valve control signal based on the header load. ECU 148 then combines the two to make a full valve control signal. ECU 148 then applies this full valve control signal to valve 158 in step 170.

ECU 148 calculates the first partial valve control signal substantially the same as it calculates the valve control signal in the first algorithm, above: calculating a height error and then processing it using a second control function (which is preferably the same as the first control function).

ECU 148 calculates the second partial valve control signal by determining a load signal error and processing the load signal error using a third control function (for example a P, PD, PID, or PI function).

ECU 148 calculates the load signal error by subtracting a reference load value from a load signal (which ECU 148 read from the load sensor 150 in step 164). ECU 148 calculates the reference load value by low pass filtering a time sequence of signals from previous ECU 148 readings of load sensor 150. This reference load value is a smoothed or time averaged load signal and indicates (in physical terms) the average load applied by the header 104 on the feeder house. Any sudden or extreme changes in the instantaneous load (read from sensor 150) from this reference load value are likely to be due to the header 104 colliding with the ground and the load signal dropping very rapidly as weight is transferred from the feeder house to the ground.

In physical terms, the second partial valve control signal is therefore a response to the occasional collision of the header 104 with the ground. The parameters of its control function are selected to provide a quick and strong upward excursion of the header 104 whenever the load signal indicates the header 104 has struck the ground. In short, the second partial valve control signal provides a strong upward force that serves to jerk the header out of the ground to prevent significant injury to the header.

Once the collision is past, the load signal measured by load sensor 150 will return to close to the reference load value (i.e. the time average value), the second partial valve control signal drops close to zero and the second algorithm again returns to a predominate height control based on header height (i.e. the system returns to height correction based on the first partial valve control signal).

The Third Algorithm

In the third algorithm, the header height is controlled based primarily on the load signal. The load signal is an indicator of how much header weight is carried by the feederhouse, and by inversion, how much header weight is carried on the ground. For low header heights, such as 0-30 mm, a portion of the header 104 is resting lightly on the ground at all times and is skimming gently across the surface of the ground without diving downward and embedding itself deeply into the ground. Thus, when header 104 is set to a height of 0-30 mm or so, portions of the header 104 are actually running gently along the ground, and a portion of the header weight is therefore resting on the ground.

As a result, the load signal generated by the load sensor 150 indicates a gradually decreasing load as the header 104 is lowered this last 30 mm (or so) until the header 104 rests completely on the ground. The header 104 cannot be operated with a load of zero indicated by load sensor 150. A load of zero indicated by load sensor 150 occurs when the entire (or substantially the entire) weight of the header 104 is resting on the ground. Any forward movement when the entire weight of the header 104 is resting on the ground would immediately and substantially damage the header 104.

During normal operations, therefore, a substantial amount of the header's weight must be carried on the feeder house, and thus the load sensor must indicate a substantial non-zero load at all times during operation.

In the third algorithm, ECU 148 controls the height of the header 104 based substantially or solely upon the header load applied to the feeder house.

ECU 148 first calculates a reference load value based upon the desired height, then calculates a load signal error by subtracting the reference load value from the load signal provided by load sensor 150. ECU 148 then processes the load signal error using a first control function (for example a P, PD, PID, or PI function) to generate a valve control signal. ECU 148 then applies (in step 170) this valve control signal to valve 158. This valve control signal is based on the load the header 104 applies to the feeder house 103. The load the header 104 applies to the feeder house 103 also indicates the load the header 104 applies to the ground, since the sum of the loads applied by the header 104 (1) to the feeder house; and (2) to the ground is generally equal to the weight of the header 104.

If the operator selects a desired height that is the minimum possible height selectable by the operator in step 166, ECU 148 will select a reference load value equal to the value generated by load sensor 150 when the header 104 is applying its maximum operating weight upon the ground (and while still being substantially supported by feeder house 103). This maximum operating weight upon the ground will typically be in the range of 200-500 pounds header weight upon the ground. This reference load value is the minimum possible load value at which the header 104 can be operated.

If the operator selects a desired height that is the maximum desired height possible for actual harvesting use while still remaining in the range of desired heights for which the third algorithm is used in step 166, ECU 148 will select a reference load value equal to the load signal generated by load sensor 150 when the header 104 is supported entirely by feeder house 103. One way of determining this reference load value is by using the reference load value which was previously calculated in the second algorithm (and described above) by low pass filtering a time sequence of signals from previous ECU 148 readings of load sensor 150. This reference load value is the maximum possible load value for the third algorithm.

If the operator selects a desired height between these two desired heights (the minimum height selectable in the low zone and the maximum height selectable in the low zone), the ECU 148 will calculate a reference load value for the third algorithm that is proportionately scaled between the minimum possible load value and the maximum possible load value for the third algorithm.

Thus, at the maximum height selectable in the low zone, the feeder house 103 will support substantially the entire weight of the header 104. At the minimum height selectable in the low zone, the ground will support the maximum header weight possible without damaging the header 104. At all intermediate selectable heights in the low zone, ECU 148 will scale the amount of weight supported by the feeder house proportionately between these two reference loads.

Many modifications and other embodiments of the inventions set forth herein will come to mind to one skilled in the art to which these inventions pertain having the benefit of the teachings presented in the foregoing descriptions and the associated drawings. The inventions are not limited to the specific embodiments disclosed. Modifications and other embodiments are included within the scope of the appended claims. Different combinations of elements and/or functions may be provided by alternative embodiments other than those described above and still be covered by the claims. Although specific terms are employed herein, they are used in a generic and descriptive sense only and not for purposes of limitation.

For example, in the description above, the first algorithm depended entirely upon the header height and was responsive to feedback provided by height sensors alone. It is possible to add other feedback control functions based on other physical parameters, including the header load upon the feeder house or upon the ground as long as the control function based on header height above the ground predominates.

As another example, in the description above, the third algorithm depends entirely upon the header load upon the feeder house (which, considered from a different perspective, is the inverse of the header load applied to the ground). It is possible to add other feedback control functions based on other physical parameters, including the header height above the ground, as long as the control function based on the header load predominates.

As another example, three different algorithms are described above that are used for the entire range of header height control. Rather than three ranges of heights (or three "zones") one of these zones and algorithms can be dispensed with. For example, the entire operating range of the header height control system can be divided into a high zone and a low zone with the first algorithm or second algorithm used for the high zone and the second or third algorithm, respectively, used for the low zone. Alternatively, the high zone can use the first algorithm and the low zone can use the third algorithm. When using the first and third algorithm, the ECU 148 can be programmed to calculate a reference load when controlling height in the high zone, and that reference load can be used as an initial reference load when the operator subsequently selects a desired height in the low zone.

As yet another example, the second algorithm can be used for the upper portion and the third algorithm can be used for the lower portion.

In another arrangement, one or more of the signals provided by the height sensors 124, 134 can be combined by the ECU 148 (such as by averaging) to provide a resultant height signal that is used in the header height control algorithm as described above. Alternatively, the ECU 148 can be configured to dynamically select one of the height sensors 124, 134 based on a predetermined criterion. The predetermined criterion can be selecting the signal from the height sensor showing the smallest height above the ground. In this manner, ECU 148 could ensure that each portion of the header 104 was maintained a certain minimum distance above the ground.

The invention claimed is:

1. A header height control system, comprising:
   an agricultural harvester (100) further comprising a self-propelled harvesting vehicle (102) and an agricultural harvesting header (104) supported on said self-propelled harvesting vehicle;
   an ECU (148);
   at least one height sensor (124, 134) coupled to the ECU (148) to provide a signal to the ECU (148) indicative of a height of the header (104) above the ground;
   at least one load sensor (150) coupled to the ECU (148) to provide a signal to the ECU (148) indicative of a load applied by the header (104); and
   an operator input device (162) coupled to the ECU (148) and configured to generate a signal indicating a desired height of travel of the header (104) above the ground when manipulated by the operator; and
   at least one header support (142, 144) disposed to change the height of the agricultural harvesting header (104) with respect to the self-propelled harvesting vehicle (102), said at least one header support (142, 144) being coupled to the ECU (148) such that the ECU (148) can drive the at least one header support (142, 144) to raise and lower the agricultural harvesting header (104) with respect to the self-propelled harvesting vehicle (102);
   wherein the ECU (148) is configured to (a) read the operator input device (162) and input the signal indicative of the desired height of travel therefrom, (b) select between a first header height control algorithm associated with a first plurality of operator selectable desired heights of travel and a second header height control algorithm associated with a second plurality of operator selectable desired heights of travel, with the first plurality of operator selectable desired heights of travel being higher than the second plurality of operator selectable desired heights of travel and with the first and second header height control algorithms being selected based upon the value of the signal indicative of the desired height of travel, and (c) drive the at least one header support (142, 144) to the desired height of travel using the selected first or second header height control algorithm, wherein the first header height control algorithm is responsive to both a height error signal and a load error signal, wherein the ECU (148) derives the height error signal by calculating a difference between the signal indicative of the desired height of travel and a header height indicated by the at least one height sensor (124, 134), and further wherein the ECU calculates the load error signal based upon a difference between the signal indicative of a load applied by the header and a reference load signal derived by the ECU (148) from a time sequence of signals from the at least one load sensor (150).

2. The header height control system of claim 1, wherein the ECU (148) is also configured to select between the first header height control algorithm, the second header height control algorithm, and a third header height control algorithm based upon the value of the signal indicative of the desired height of travel, and drive the at least one header support (142, 144) to the desired height of travel using the selected one of the first header height control algorithm, the second header height control algorithm, or the third header height control algorithm.

3. A header height control system, comprising:
   an agricultural harvester (100) further comprising a self-propelled harvesting vehicle (102) and an agricultural harvesting header (104) supported on said self-propelled harvesting vehicle;

an ECU (148);

at least one height sensor (124, 134) coupled to the ECU (148) to provide a signal to the ECU (148) indicative of a height of the header (104) above the ground;

at least one load sensor (150) coupled to the ECU (148) to provide a signal to the ECU (148) indicative of a load applied by the header (104); and an operator input device (162) coupled to the ECU (148) and configured to generate a signal indicating a desired height of travel of the header (104) above the ground when manipulated by the operator; and at least one header support (142, 144) disposed to change the height of the agricultural harvesting header (104) with respect to the self-propelled harvesting vehicle (102), said at least one header support (142, 144) being coupled to the ECU (148) such that the ECU (148) can drive the at least one header support (142, 144) to raise and lower the agricultural harvesting header (104) with respect to the self-propelled harvesting vehicle (102);

wherein the ECU (148) is configured to (a) read the operator input device (162) and input the signal indicative of the desired height of travel therefrom, (b) select between a first header height control algorithm associated with a first plurality of operator selectable desired heights of travel and a second header height control algorithm associated with a second plurality of operator selectable desired heights, with the first plurality of operator selectable desired heights of travel being higher than the second plurality of operator selectable desired heights of travel, and with the algorithm selection being based upon the value of the signal indicative of the desired height of travel, and (c) drive the at least one header support (142, 144) to the desired height of travel using the selected first or second header height control algorithm, and wherein the first header height control algorithm is at least responsive to a height error signal and wherein the second header height control algorithm is at least responsive to a load error signal.

4. The header height control system of claim 3, wherein the ECU (148) derives the load error signal by calculating a difference between a reference load value and a header load indicated by the at least one load sensor (150).

5. The header height control system of claim 4, wherein the ECU (148) calculates the reference load value by averaging a time sequence of load signals taken from the at least one load sensor (150).

6. The header height control system of claim 4, wherein the ECU (148) calculates the reference load value by selecting the reference load value from between a first predetermined load value and a second predetermined load value, wherein the second predetermined load value is indicative of a signal received from the at least one load sensor (150) when it is operating at substantially its lowest operating height when traveling through the field harvesting crops.

7. A header height control system, comprising:

an agricultural harvester (100) further comprising a self-propelled harvesting vehicle (102) and an agricultural harvesting header (104) supported on said self-propelled harvesting vehicle;

an ECU (148);

at least one height sensor (124, 134) coupled to the ECU (148) to provide a signal to the ECU (148) indicative of a height of the header (104) above the ground;

at least one load sensor (150) coupled to the ECU (148) to provide a signal to the ECU (148) indicative of a load applied by the header (104); and an operator input device (162) coupled to the ECU (148) and configured to generate a signal indicating a desired height of travel of the header (104) above the ground when manipulated by the operator; and at least one header support (142, 144) disposed to change the height of the agricultural harvesting header (104) with respect to the self-propelled harvesting vehicle (102), said at least one header support (142, 144) being coupled to the ECU (148) such that the ECU (148) can drive the at least one header support (142, 144) to raise and lower the agricultural harvesting header (104) with respect to the self-propelled harvesting vehicle (102);

wherein the ECU (148) is configured to (a) read the operator input device (162) and input the signal indicative of the desired height of travel therefrom, (b) select among a first header height control algorithm associated with a first plurality of operator selectable desired heights of travel, a second header height control algorithm associated with a second plurality of operator selectable desired heights of travel or a third header height control algorithm associated with a third plurality of operator selectable desired heights of travel, with the algorithm selection being based upon the value of the signal indicative of the desired height of travel, and (c) drive the at least one header support (142, 144) to the desired height of travel using the selected one of the first, second or third header height control algorithm.

8. The header height control system of claim 7, wherein the first plurality of operator selectable desired heights of travel are higher than the second plurality of operator selectable desired heights of travel, and further wherein the second plurality of operator selectable desired heights of travel are higher than the third plurality of operator selectable desired heights of travel.

9. The header height control system of claim 8, wherein the first header height control algorithm is predominantly responsive to a height error signal, wherein the second header height control algorithm is predominantly responsive to a height error signal and a load error signal, and wherein the third header height control algorithm is predominantly responsive to a load error signal.

10. The header height control system of claim 9, wherein the height error signal is derived from a difference between an operator selected desired height of travel of the header and the signal indicative of a height of the header (104) provided by the at least one height sensor (124, 134).

11. The header height control system of claim 9, wherein the load error signal is derived from a difference between a reference load value and the signal indicative of a load applied by the header (104).

12. The header height control system of claim 9, wherein the first header height control algorithm is derived entirely from a header height error, and wherein the third header height control algorithm is derived entirely from a header load error.

* * * * *